Sept. 22, 1959 R. L. DREYFUS ET AL 2,904,943
METHOD AND APPARATUS FOR PACKAGING ARTICLES
IN SHRINKABLE PLASTIC FILM
Filed Aug. 20, 1958
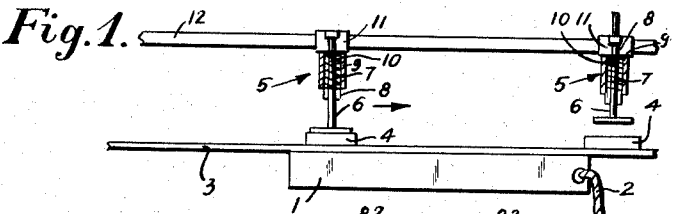
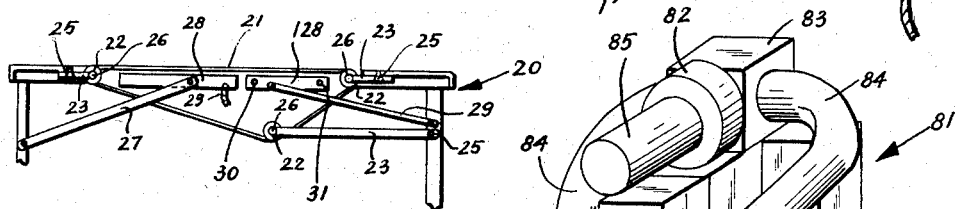
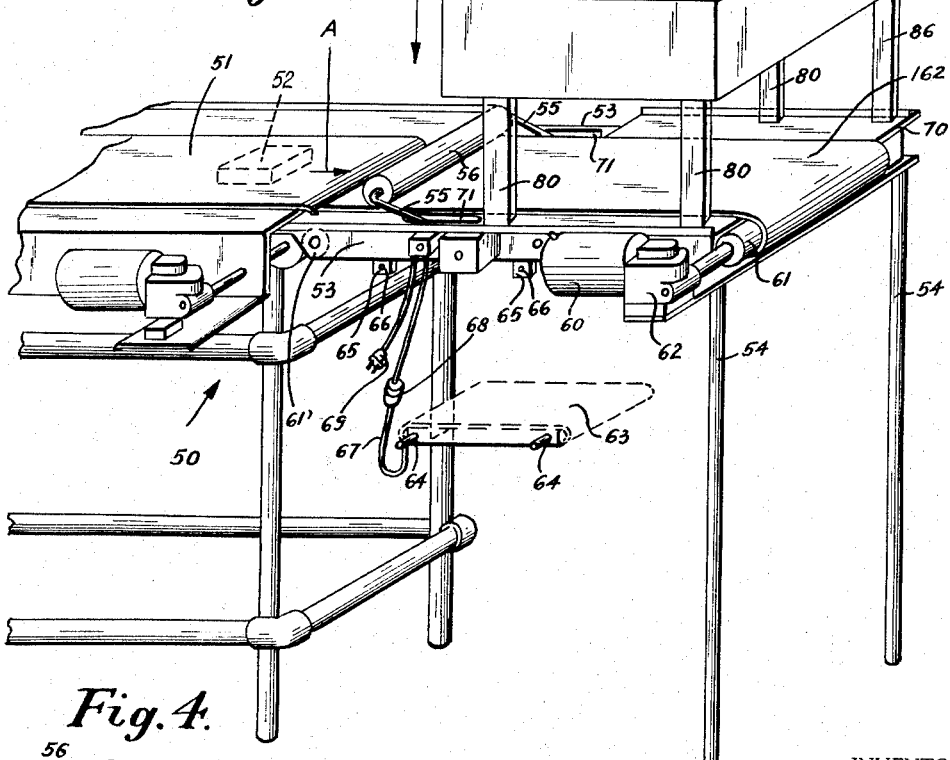
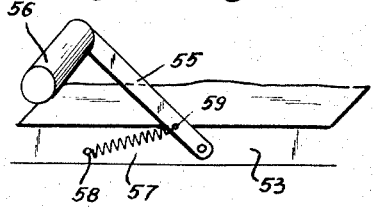
INVENTOR
Robert L. Dreyfus
Milton A. Howe Jr.
BY Richard R. Perdue
Cushman, Darby & Cushman
ATTORNEYS

# United States Patent Office 2,904,943
Patented Sept. 22, 1959

2,904,943

METHOD AND APPARATUS FOR PACKAGING ARTICLES IN SHRINKABLE PLASTIC FILM

Robert L. Dreyfus, Arlington, and Milton A. Howe, Jr., Bedford, Mass., and Richard R. Perdue, Taylors, S.C., assignors to W. R. Grace & Co., Cambridge, Mass., a corporation of Connecticut Application August 20, 1958, Serial No. 756,207

6 Claims. (Cl. 53—33)

This invention relates to methods of, and apparatus for, properly packing products in shrinkable plastic film.

Irradiated polyethylene film which has been bi-axially stretched has been found to be an excellent overwrap material. The high shrink energy of such film which is advantageous for many purposes causes certain wrapping problems. In particular, the shrink energy possessed by these films creates problems with regard to the sealing of multi-layer overwrap areas and the sealing of these areas while at the same time effecting of a "tight" fit between product and film, and the instant invention is concerned with these problems as well as with the general problem of automatically packaging articles in shrinkable plastic films.

More specifically, in using high shrink energy polyethylene films of the type described in Baird application Serial No. 713,848, filed February 7, 1958, as an overwrap material, it has been found: (a) that it is virtually impossible to effect a satisfactory seal with such film when using an ordinary hot plate; (b) that the multi-layer overwrap areas of high shrink energy film will separate and not seal if some prior art techniques are used; (c) while if other prior art techniques are used, rupture of any sealing achieved occurs before a final seal can be made; and (d) that the prior art methods do not yield a non-wrinkled overwrap area.

Accordingly, it is a general object of this invention to provide methods and apparatus which are particularly adapted for effecting extremely satisfactory overwrapping of packages with bi-axially stretched high shrink energy polyethylene films such as those disclosed in the Baird application for example. At the same time, it is also an object of this invention to provide a method and apparatus for automatically sealing and shrinking other types of shrinkable film including Saran (vinylidene chloride resin), polyethylene terephthalate, polystyrene, etc.

Other, and more specific objects of this invention are (1) to provide a method of sealing packages overwrapped with a high shrink energy polyethylene film as described above by using an ordinary hot plate, (2) to provide a method for effectively sealing packages overwrapped with such high shrink energy film which method has low space requirements, (3) to provide a relatively small apparatus for hand sealing packages overwrapped with such high shrink energy film, (4) to provide a method of sealing products overwrapped with shrinkable plastic film and to cause the film to tightly engage the product and form a "skin" thereover, and (5) to provide an apparatus for automatically sealing packages overwrapped with shrinkable plastic film and to cause the film to tightly engage the product and form a skin thereover.

Shrink energy, as used hereinbefore and hereinafter in this specification, is defined as the force of contraction at a given temperature when the material is restrained. More specifically, it is defined as the measurable tension produced in a fully mono-directionally restrained strip of film when heated to a specified temperature. In accordance with this definition, it should be apparent that a high shrink energy film is one that has a high tension when fully restrained and heated to a given temperature. In general the shrink energy will be at least 100 p.s.i. and may be as high as 500 p.s.i. utilizing the irradiated high shrink energy polyethylene film of the Baird application. Because of this high shrink energy, a product overwrapped with such film cannot be just placed on a heating means to seal the multi-layer overwrapped areas because the seal would separate under the tension. For the same reasons and because of the resultant wrinkles that would be produced in the single layer overwrap area, the multi-layer areas cannot be initially sealed at the same time that the remaining overwrap is being shrunk by heat. This invention therefore provides a method whereby the multi-layer overwrap area is restrained while sealing the same in utilizing high shrink energy film as above defined. In addition the invention provides for an improved method of sealing a package overwrapped with irradiated bi-axially oriented polyethylene film by means of heating the multi-layer overwrapped area and subsequently cooling the same while continually restraining the material in that area. Furthermore, the invention provides an improved method for sealing packages overwrapped with shrinkable plastic film of the type previously referred to, and apparatus for automatically carrying out the method whereby sealing of the multi-layer overwrap area is accomplished and the film is shrunk to become a "skin" fitting tightly over the article or package covered with the material.

The invention also utilizes heating means over which a strip of heat resistant flexible material in contact with the multi-layer area passes. In the preferred embodiments of the invention there is provision for making the strip of Teflon (polytetrafluoroethylene). In place of Teflon there can be utilized other heat resistant plastic such as polychlorotrifluoroethylene (Kel–F) and flexible plastic impregnated glass cloth. Also, in some embodiments the flexible strip is in continuous belt form.

According to the invention, pressure is applied to the article or package overwrapped with the high shrink energy material while the article or package is carried on the strip of flexible material. The multi-layer overwrap area is continuously in contact with the strip and is not displaced with respect thereto while the area is heated or heated and sealed, nor while under pressure. Additionally, according to one embodiment of the invention, the overwrapped package or article is not displaced from the strip when the single layer overwrap portion is shrunk to form a tight skin.

By practicing the invention, the above stated objects are achieved and it is possible to obtain a "skin tight" overwrapped package or article which is properly sealed and not wrinkled.

Of course, other objects than those specifically set forth above will become apparent to those of ordinary skill in the art.

The invention may be better understood after consideration is given to the following illustrative embodiments of the invention. These illustrative embodiments are described in connection with the annexed drawing, wherein:

Figure 1 is a side view in somewhat schematic form of an apparatus for hot plate sealing the multi-layer overwrap area of packages or articles wrapped in a high shrink energy bi-axially oriented irradiated polyethylene film of the type disclosed in the Baird application;

Figure 2 is a side view in somewhat schematic form showing a new and improved apparatus for sealing the multi-layer overwrap area of a package wrapped in such a high shrink energy film, the apparatus of Figure 2 being illustrative of another embodiment of this invention;

Figure 3 is a perspective view of an apparatus constructed in accordance with this invention for automatically sealing and shrinking shrinkable plastic films around a product or package wrapped in the same; and Figure 4 is a more detailed view of the roller construction of Figure 3.

Referring now more particularly to Figure 1, the numeral 1 designates an ordinary hot plate of the type commonly used to seal packages wrapped in ordinary plastic films. This hot plate is heated by electricity as is conventional, and has a cord 2 extending therefrom for connection with an ordinary electrical outlet. Passing over the upper or "hot" surface of the plate 1 is a continuous strip of Teflon (polytetrafluoroethylene). In place of the Teflon other heat resistant plastics such as Kel–F can be used. This strip is designated by the numeral 3 and is at least as wide as the package 4 or article to be wrapped. Acting in cooperation with the hot plate 1 and Teflon strip 3 are a plurality of pressure-applying devices 5. These pressure-applying devices comprise a plunger member 6 which fits within a cylinder 7. The plunger has a transverse protuberance 8 which cooperates with a transverse wall 9 to lock the plunger out of pressing engagement with the package 4. The plunger is spring biased by spring 10. The whole pressure-applying device 5 is moveable with respect to the hot plate 1, because housing 11 of the device rides on and is supported by a bar or track 12. However, it should be understood that the particular pressure-applying device forms no part of the instant invention and that any suitable pressure-applying means may be used without departing from the scope of this invention. In fact, pressure may be applied to the package by hand.

As pointed out above, prior to developing the method provided by this invention, it was virtually impossible to seal bi-axially oriented polyethylene film with a hot plate. This was due to the high shrink energy of the film and the fact that it softened quite markedly when sealed. However, by utilizing this invention it is now possible to satisfactorily hot plate seal such high shrink energy films.

Referring again to Figure 1, the multi-layer overwrap area (bottom) of the package 4 is placed on the free moving Teflon strip 3 which is passing over hot plate 1 having a temperature of 165° C. Pressure is applied by way of plunger 4. When sufficient sealing time elapses, e.g. ½ to 6 seconds (preferably 1½ seconds), the pressure plunger is removed, and the package 4 and Teflon strip 3 are displaced off of the hot plate. The Teflon strip 3 and package 4 may remain stationary during the sealing operation, or since the pressure-applying devices 5 are moveable, the strip and package may be moved. However, the package must remain fixed with respect to the Teflon strip during sealing, or until the polyethylene film has cooled adequately. After cooling, the package may be removed from the Teflon strip and the seal is not ruptured. By applying pressure, the polyethylene film is restrained during sealing so that a complete seal may be made without the layers in the multi-layer overwrap area separating, and without wrinkling the remaining portion of the package or single layer overwrap area. By utilizing Teflon for the strip material, no sticking occurs between the package seal and the flexible strip and heat is adequately transmitted from the hot plate to the multi-layer overwrap area to be sealed.

Although the process or method described with reference to Figure 1 is adequate and provides for hot plate sealing of bi-axially stretched polyethylene film which was heretofore virtually impossible, the apparatus of Figure 2, and method described in connection therewith allow for a faster hand sealing operation. In Figure 2, the numeral 20 generally designates a table. The table has an opening in the center in which is supported an endless conveyor. The conveyor comprises a flexible Teflon belt 21 and spaced elongated rollers 22. These rollers may be supported by braces such as those designated by numeral 23 which are fixed to the table by screws 25, or other suitable means. As shown, the braces 23 have apertures 26 in the ends which are not fixed to the table and through these apertures pass shafts supporting the rollers. Of course, there is a spaced counterpart to each roller 22 shown such that the rollers are supported at either end.

Beneath the conveyor, and supported by brace 27 is a hot plate 28 having an electrical connection cord 29 extending therefrom. This hot plate may be similar to hot plate 1 of Figure 1. Brace 27 is coupled to the table by means of screws, or other suitable means.

Also supported beneath the conveyor belt 21 is a cold plate 128. Brace 29 serves to fix cold plate 128 in position in the same manner as brace 27 supports hot plate 28. It should be understood that the means for supporting the rollers, the hot plate and the cold plate shown in Figure 2 form no part of the instant invention, and that any supporting means may be used to hold the various elements in position. At the same time, however, the disposition of a heating means and cooling means below an endless conveyor belt is an important feature of the invention. The heating means, although described as a hot plate, may be any suitable heating means such as a metallic casing having a coiled tubular passage therethrough for steam or hot water. Similarly, the cold plate 128 may be any suitable form of cooling means, but as shown it comprises a casing 28 through which a tubular coil passes. The coil has an inlet 30 and an outlet 31 so that cold water can be circulated therethrough.

By utilizing the apparatus presented in Figure 2, overwrapped packages may be sealed in the following manner. The multi-layer overwrap area (bottom) of the package wrapped in irradiated bi-axially oriented high shrink energy polyethylene is placed on belt 21 and moderate pressure (preferably less than one pound per square inch, 1 p.s.i.) is applied. This package is then advanced, without being displaced with respect to the belt 21, over the hot plate 28 having a temperature of 165° C. in the specific example. The application of pressure to the package over the hot plate speeds up heating and prevents delamination (separation) of the seal due to the shrinking. The package is moved forward after a short time, preferably about 2 to 5 seconds (3 seconds being employed in the example) to a position over the cold plate having a temperature of 5° C. in the example and since the belt is free moving there is essentially no movement between the package and the belt. This lack of relative movement between belt and package is important because the hot plastic film has low strength and is easily ruptured. By not having movement between belt and the multi-layer overwrap area there is no chance of rupture of the seal. The package remains on the cold plate for a short time, preferably from two to three seconds, whereupon the sealed area is cooled. After cooling, the package is removed from the belt without sticking and an excellent seal results.

The apparatus and methods which have been described thus far all are concerned primarily with sealing the multi-layer overwrap area of a package wrapped in high shrink energy bi-axially oriented irradiated polyethylene film. They are not concerned with the general shrinking of plastic films to form a second skin over the wrapped article or package. However, as initially pointed out this invention also provides an apparatus which will seal such films and shrink the same automatically. This apparatus is presented in Figure 3, and will operate on various types of shrinkable plastic films, such as for example, Saran or Mylar (polyethylene terephthalate), polystyrene, nylon, conventional blown polyethylene, etc. By referring to Figure 3 it will be noted that the numeral 50 designates a table having a conveyor 51 moving across the top thereof. A package 52 is carried by the conveyor and moves in the direction of the arrow A onto the apparatus provided by this embodiment of the instant invention. Conveyor 51 carries the packages from the wrapping station to the sealing and shrinking apparatus. This apparatus comprises a pair of sills 53 supported at their left ends by the table 50 and supported at their right ends by legs 54. Pivotally secured, as by rivets, to the inside of either sill 53 is an arm 55 which supports a weighted roller 56. This construction is presented in Figure 4, wherein it will be noted that the arms 55 are biased by a spring 57 attached, as by a weld, to sill 53 and arm 55, as at points 58 and 59, respectively. Also, coupled to the sills, as shown in Figure 3, is an electric motor 60 which drives a roller 61 through gear coupling in gear box 62. The roller serves to drive an endless conveyor belt 162 which has one face passing in alignment with conveyor 51. The roller 61 has a spaced counterpart, namely roller 61' which is also supported by the sills 53. Roller 61', of course is disposed at the opposite end of the sills from roller 61.

Disposed beneath the upper face of endless belt 162 is a hot plate 63 having shaft like protuberances 64 extending outwardly from the sides thereof. These protuberances fit within apertures 66 of blocks 65 extending from the sills 53. The protuberances cooperate with the blocks to support the hot plate beneath the upper face of conveyor belt 162. The hot plates has been "dropped down" in the drawing for illustrative purposes.

Extending from hot plate 63 is a cord 67 which goes through switch 68 and connects with electrical connection cord 69, whereby the hot plate may conveniently be turned "on" and "off".

The sills 53 support a sheet 70 which extends between the sills and supports the conveyor belt 162. Sheet 70 has small elongated apertures 71 on either side thereof through which arms 55 pass and also has an aperture in which the upper face of hot plate 63 is positioned.

The sills 53 also support the legs 80 which depend from, and support, hot air oven 81. This hot air oven comprises a fan, motor and heating element disposed in casings 85, 82, and 83, and a plurality of ducts 84 for distributing the hot air produced by the fan and heater to the cover 86 which is disposed over conveyor belt 82 partially to the right of the hot plate 63. The hot air oven is of conventional design, and there can be used any means of producing a hot air stream in a relatively confined area.

Operation of the apparatus shown in Figure 3 is as follows. The multi-layer overwrap area of a package wrapped in shrinkable plastic film, e.g., shrinkable polyethylene engages belt 162 and moves with the belt off of belt 51. It presses against roller 56 which causes the roller to lift vertically until it engages the top of the package whereupon the roller presses upon the top of the package and as a result the various layers in the multi-layer overwrap area are pressed together to form an initial sticking seal. The belt 162 then carries the package over the hot plate and the multi-layer area is heated and sealed. After sufficient sealing has taken place, the belt carries the package under the hot air oven and the film shrinks whereby a tight skin exist over the package or article covered with the shrinkable film. It is essential that the shrinking of the single layer overwrap area takes place after the initial sealing is done. This eliminates seal rupture. Additionally, it is pointed out that although continuous movement of the belt 162 is preferred, the belt may be stopped at given locations if desired. By using a moving belt, it is possible to seal heat softening plastics with a hot plate.

Of course, with certain types of shrinkable polyethylene film it may be necessary or desirable to include a cooling unit in the apparatus next to the heating unit so that the seal is completely, and more rapidly made, prior to shrinking of the single layer overwrap area. Such modification may easily be made in the Figure 3 apparatus by following the teachings of the embodiment shown in Figure 2. Also, if necessary, pressure may be automatically applied to the package during the whole time it travels over the heating means, or heating means and cooling means, by following the teachings of Figure 1.

Notwithstanding the fact that details of particular elements have been described, it should be pointed out that, as suggested with regard to other embodiments of this invention, the heating may be operated by water, steam or other fluid as well as electrically. Similarly the cooling can be accomplished with the aid of water or other fluids.

The high shrink energy polyethylene can be prepared for example by irradiating polyethylene, e.g., alathon 14, to 2 to 100 megarad, preferably 8 to 20 megarad, and then stretching longitudinally 100 to 700% and laterally 100 to 900%. In the specific examples above there was used alathon 14 irradiated to a dosage of 12 megarad and stretched 350% in both directions. The shrink enregy was over 100 p.s.i.

Since other modifications than those suggested in this specification will become apparent to those of ordinary skill in the art, or even a layman, it is intended that the above description be interpreted as illustrative and not in a limiting sense.

What is claimed is:

1. An apparatus for sealing the multi-layer overwrap area of a package wrapped in shrinkable plastic film, said apparatus comprising the combination of a frme, an endless conveyor means supported by said frame and having a moving belt, means for driving said belt, pressure-applying means disposed above said belt, heating means disposed behind said pressure-applying means in the direction of travel of said belt for heating said belt and the multi-layer overwrap area of packages carried thereby, and a hot gas oven disposed above said belt and at least partially behind said heating means in the direction of travel of said belt, whereby when the multi-layer overwrap area of an article wrapped in a shrinkable plastic film is placed in contact with said belt and said belt is driven, said package is pressed against said belt by said pressure-applying means, said multi-layer overwrap area is then heated and sealed by said heating means, and said film is shrunk tightly around said article by the hot gas from said oven, all without displacing said package with respect to said belt.

2. An apparatus for sealing as defined in claim 1 wherein said pressure applying means comprises a weighted roller pivotally supported by said frame.

3. An apparatus for sealing as defined in claim 2 wherein said roller is also coupled to said frame by springs which urge the roller against said belt in the direction opposite to the direction of travel of said belt.

4. An apparatus for sealing as defined in claim 1 wherein said heating means comprises a hot plate.

5. A method of sealing the multi-layer overwrap area of an article wrapped in shrinkable plastic film comprising the steps of placing the multi-layer overwrap area of said package in contact with one side of a high temperature resistant flexible carrier material, applying pressure to said article to cause the layers in the multi-layer area to stick together without displacing said wrapped article with respect to said carrier material, heating said carrier and the portion of said wrapped article in contact therewith to seal the layers of said multi-layer area together without displacing said article with respect to said carrier material, and then heating substantially the balance of said wrapped article to cause said film to shrink tightly over said article without displacing said article with respect to said carrier material.

6. A method according to claim 5 wherein the heating to cause shrinkage of the film is accomplished by blowing hot gas on said wrapped article.

References Cited in the file of this patent

UNITED STATES PATENTS

| 2,549,123 | Osterhof | Apr. 17, 1951 |
| 2,556,008 | Spalding | June 5, 1951 |
| 2,827,743 | Rumsey | Mar. 25, 1958 |

FOREIGN PATENTS

| 114,269 | Australia | Dec. 4, 1941 |